US011680191B2

(12) United States Patent
Lee et al.

(10) Patent No.: US 11,680,191 B2
(45) Date of Patent: Jun. 20, 2023

(54) OPTICAL LAMINATE

(71) Applicant: SHANJIN OPTOELECTRONICS (SUZHOU) CO., LTD., Zhangjiang (CN)

(72) Inventors: Dong Hun Lee, Daejeon (KR); Seul Ki Han, Daejeon (KR); Hyun Hee Son, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 301 days.

(21) Appl. No.: 16/766,980

(22) PCT Filed: Nov. 29, 2018

(86) PCT No.: PCT/KR2018/014908
§ 371 (c)(1),
(2) Date: May 26, 2020

(87) PCT Pub. No.: WO2019/107951
PCT Pub. Date: Jun. 6, 2019

(65) Prior Publication Data
US 2021/0032505 A1 Feb. 4, 2021

(30) Foreign Application Priority Data

Nov. 30, 2017 (KR) ........................ 10-2017-0163609

(51) Int. Cl.
| | |
|---|---|
| *C09J 7/38* | (2018.01) |
| *C09J 7/29* | (2018.01) |
| *B32B 7/12* | (2006.01) |
| *B32B 27/08* | (2006.01) |
| *B32B 27/18* | (2006.01) |
| *B32B 27/36* | (2006.01) |
| *C08K 3/08* | (2006.01) |
| *C08K 5/00* | (2006.01) |
| *C09J 133/10* | (2006.01) |
| *G02B 5/20* | (2006.01) |
| *G02B 5/30* | (2006.01) |

(52) U.S. Cl.
CPC ................ *C09J 7/385* (2018.01); *B32B 7/12* (2013.01); *B32B 27/08* (2013.01); *B32B 27/18* (2013.01); *B32B 27/36* (2013.01); *C08K 3/08* (2013.01); *C08K 5/0025* (2013.01); *C09J 7/29* (2018.01); *C09J 133/10* (2013.01); *G02B 5/20* (2013.01); *G02B 5/305* (2013.01); *B32B 2307/42* (2013.01); *B32B 2367/00* (2013.01); *C08K 2003/0825* (2013.01); *C08K 2003/0893* (2013.01); *C09J 2301/302* (2020.08); *C09J 2301/312* (2020.08); *C09J 2301/414* (2020.08); *C09J 2433/00* (2013.01)

(58) Field of Classification Search
None
See application file for complete search history.

(56) References Cited

U.S. PATENT DOCUMENTS

| | | |
|---|---|---|
| 2005/0285286 A1 | 12/2005 | Shuto et al. |
| 2007/0148485 A1 | 6/2007 | Kusama et al. |
| 2008/0023132 A1 | 1/2008 | Sano et al. |
| 2008/0278672 A1* | 11/2008 | Yano ....................... C09J 133/08 349/193 |
| 2009/0040611 A1* | 2/2009 | Kitamura ........... B29D 11/0073 264/1.34 |
| 2011/0234948 A1 | 9/2011 | Yoon et al. |
| 2012/0086892 A1* | 4/2012 | Kim ................... C08G 18/8029 359/483.01 |
| 2012/0100359 A1* | 4/2012 | Kishioka ................ C09J 133/14 428/220 |
| 2012/0236408 A1 | 9/2012 | Kwon et al. |
| 2012/0253061 A1* | 10/2012 | Takahashi .............. G02B 30/25 359/464 |
| 2013/0114137 A1* | 5/2013 | Bae ...................... G02B 5/3083 427/163.1 |
| 2013/0164478 A1* | 6/2013 | Yamamoto ................. C09J 7/10 428/335 |
| 2013/0288048 A1* | 10/2013 | Toyama ................. C09J 175/04 524/558 |
| 2014/0016067 A1* | 1/2014 | Yoon .................. C08G 18/8029 349/96 |
| 2014/0347727 A1* | 11/2014 | Inui ...................... G02B 5/3025 359/483.01 |

FOREIGN PATENT DOCUMENTS

| | | | |
|---|---|---|---|
| EP | 2727973 A1 * | 5/2014 | ........... C09J 133/06 |
| JP | 2006017747 A | 1/2006 | |

(Continued)

OTHER PUBLICATIONS

Matsumoto—JP 2008-249901 A—ISR D1—MT+Google—polarizer & display—2008 (Year: 2008).*

(Continued)

*Primary Examiner* — John Vincent Lawler
(74) *Attorney, Agent, or Firm* — Schmeiser, Olsen & Watts, LLP

(57) ABSTRACT

An optical laminate is provided where stable durability is secured even at a high temperature, particularly an ultra-high temperature of about 100° C. or higher, no white turbidity is caused, other physical properties required for the optical laminate are also excellent, and even in the case of being disposed adjacent to the electrode, corrosion of the relevant electrode or the like is not induced.

20 Claims, No Drawings

(56) References Cited

FOREIGN PATENT DOCUMENTS

| JP | 2006047978 | A | | 2/2006 | |
|---|---|---|---|---|---|
| JP | 2008/249901 | | * | 10/2008 | ............... G02B 5/30 |
| JP | 2011/225764 | | * | 11/2011 | ............. B32B 27/00 |
| JP | 2012516468 | A | | 7/2012 | |
| JP | 2014515046 | A | | 6/2014 | |
| JP | 5841536 | B2 | | 1/2016 | |
| JP | 2017110077 | A | | 6/2017 | |
| JP | 2012524143 | A | | 10/2021 | |
| KR | 20070068282 | A | | 6/2007 | |
| KR | 20080010308 | A | | 1/2008 | |
| KR | 100960731 | B1 | | 5/2010 | |
| KR | 20100088583 | A | | 8/2010 | |
| KR | 100983026 | B1 | | 9/2010 | |
| KR | 20120110032 | A | | 10/2012 | |
| KR | 20120124394 | A | | 11/2012 | |
| KR | 2014/0120262 | | * | 10/2014 | ............ C09J 133/06 |
| KR | 20140142821 | A | | 12/2014 | |
| KR | 20160073631 | A | | 6/2016 | |
| KR | 20160117282 | | * | 10/2016 | ............. B32B 15/20 |
| KR | 20160117282 | A | | 10/2016 | |
| KR | 20170066381 | A | | 6/2017 | |
| TW | 200600845 | A | | 1/2006 | |
| TW | 2017/13741 | | * | 4/2017 | ............. C09J 11/06 |
| TW | 201726871 | A | | 8/2017 | |
| WO | 2004113973 | A1 | | 12/2004 | |
| WO | WO-2016194715 | A1 | * | 12/2016 | ............. C09J 11/06 |
| WO | 2017104349 | A1 | | 6/2017 | |
| WO | WO-2017104349 | A1 | * | 6/2017 | ............. C09J 11/06 |

OTHER PUBLICATIONS

Ota—JP 2011-225764 A—ISR D8—MT—optical adhesive—2011 (Year: 2011).*
Choi—KR 2014-0120262 A—ISR D2—MT—optical adhesive—2014 (Year: 2014).*
Muroi—WO 2016-194715 A1—ISR D9—MT—polarizing plate w-adhesive—2016 (Year: 2016).*
Sakaue—KR 2016-0117282 A—IDS—MT—methacrylate resin w-ionic compound+amount+motivation—2016 (Year: 2016).*
Misumi—TW 2017-13741 A-TW pat. D1—MT—adhesive for polarizing plate—2017 (Year: 2017).*
Asatsu—WO 2017-104349 A1—Euro. D1—sister of Jap.Pat.D1—MT—adhesive comp, w- hydroxy+aromatic+organic salt-2017 (Year: 2017).*
Millipore-Sigma—Benzyl acrylate—May 13, 2022 (Year: 2022).*
PubChem—2-Phenoxyethyl acrylate _ C11H12O3—May 16, 2022 (Year: 2022).*
Extended European Search Report including Written Opinion for Application No. EP18883328.9 dated Dec. 11, 2020, 8 pages.
International Search Report from Application No. PCT/KR2018/014908 dated Mar. 5, 2019, 2 pages.
Taiwanese Search Report for Application No. TW 107142798 dated Jun. 26, 2019, 1 page.

* cited by examiner

OPTICAL LAMINATE

CROSS REFERENCE TO RELATED APPLICATIONS

The present application is a national stage entry under 35 U.S.C. § 371 of International Application No. PCT/KR2018/014908 filed on Nov. 29, 2018, which claims priority to Korean Patent Application No. 10-2017-0163609 filed on Nov. 30, 2017, the disclosures of which are incorporated herein by reference in their entirety.

TECHNICAL FIELD

The present application relates to an optical laminate.

BACKGROUND ART

Various optical films such as a polarizing plate are applied to various display devices such as an LCD (liquid crystal display) or an OLED (organic light emitting diode). Such an optical film is generally attached to a display device by a pressure-sensitive adhesive.

As applications of the display device are expanded, high reliability is required for the optical film and the pressure-sensitive adhesive. For example, optical films and pressure-sensitive adhesives used in navigation or automotive displays, and the like are required to stably maintain their performance even when they are kept at a very high temperature for a long period of time.

DISCLOSURE

Technical Problem

The present application relates to an optical laminate.

Technical Solution

The optical laminate of the present application comprises an optical film and a pressure-sensitive adhesive layer formed on one side or both sides of the optical film. If necessary, a release film may be formed on the pressure-sensitive adhesive layer formed on one side or both sides of the optical film. The pressure-sensitive adhesive layer may include a pressure-sensitive adhesive polymer having an alkyl (meth)acrylate unit having an alkyl group with 4 or more carbon atoms, an alkyl (meth)acrylate unit having an alkyl group with 3 or less carbon atoms, an aromatic group-containing monomer unit and a polar group-containing monomer unit and an organic alt, and the pressure-sensitive adhesive layer has a room temperature storage elastic modulus of 0.07 MPa or more and a gel fraction of 80 wt % or more according to Equation 1 below:

$$\text{Gel fraction} = B/A \times 100 \quad \text{[Equation 1]}$$

wherein, B/A is a ratio of a dry mass (B) (unit: g) of an insoluble fraction recovered after immersing the pressure-sensitive adhesive layer in ethyl acetate at room temperature for 24 hours to a mass (unit: g) (A) of the pressure-sensitive adhesive layer before immersing the pressure-sensitive adhesive layer in ethyl acetate.

The type of the optical film included in the optical laminate of the present application is not particularly limited, and various types used in various display devices may be included. For example, the optical film may be exemplified by a polarizing plate, a polarizer, a polarizer protective film, a retardation film, a viewing angle compensation film or a luminance enhancement film, and the like. In this specification, the term polarizer and polarizing plate refers to subjects that are distinguished from each other. The polarizer refers to a film, sheet or element itself exhibiting a polarization function, and the polarizing plate means an optical element including other elements together with the polarizer. Other elements that can be included in the optical element together with the polarizer can be exemplified by a polarizer protective film or a retardation layer, and the like, but is not limited thereto.

Basically, the polarizer that can be included in the optical film of the present application is not particularly limited. For example, as the polarizer, a polyvinyl alcohol polarizer can be used. The term polyvinyl alcohol polarizer may mean, for example, a resin film of polyvinyl alcohol (hereinafter, may be referred to as PVA) series containing an anisotropic absorbent material such as iodine or a dichroic dye. Such a film can be produced by incorporating an anisotropic absorbent material into a polyvinyl alcohol-based resin film and orienting it by stretching or the like. Here, the polyvinyl alcohol-based resin may include polyvinyl alcohol, polyvinyl formal, polyvinyl acetal or a saponified product of ethylene-vinyl acetate copolymer, and the like. The degree of polymerization of the polyvinyl alcohol-based resin may be 100 to 5,000 or 1,400 to 4,000 or so, but is not limited thereto.

Such a polyvinyl alcohol polarizer can be produced, for example, by performing at least a dyeing process, a cross-linking process and a stretching process on a PVA-based film. In the dyeing step, the crosslinking step and the stretching step, respective treating baths of a dyeing bath, a crosslinking bath and a stretching bath are used, where these respective treating baths can be used by a treating solution according to each process.

In the dyeing process, the anisotropic absorbent material can be adsorbed and/or oriented on the PVA-based film. Such a dyeing process can be performed together with the stretching process. The dyeing can be performed by immersing the film in a solution containing an anisotropic absorbent material, for example, an iodine solution. As the iodine solution, for example, an aqueous solution or the like containing iodine, and iodine ions by an iodinated compound as a dissolution aid may be used. As the iodinate compound, for example, potassium iodide, lithium iodide, sodium iodide, zinc iodide, aluminum iodide, lead iodide, copper iodide, barium iodide, calcium iodide, tin iodide or titanium iodide, and the like may be used. The concentration of iodine and/or iodine ions in the iodine solution can be adjusted in consideration of the desired optical characteristics of the polarizer, and such an adjustment method is known. In the dyeing process, the temperature of the iodine solution is usually 20° C. to 50° C. or 25° C. to 40° C. or so, and the immersion time is usually 10 seconds to 300 seconds or 20 seconds to 240 seconds or so, but is not limited thereto.

The crosslinking process performed during the production process of the polarizer can be performed, for example, using a crosslinking agent such as a boron compound. The order of the crosslinking process is not particularly limited, which can be performed, for example, together with the dyeing and/or drawing process or can proceed separately. The crosslinking process may also be performed several times. As the boron compound, boric acid or borax, and the like may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the degree of crosslinking and the resulting heat resistance, and the like. The iodinated compound such as potassium iodide can also be contained in an aqueous boric acid solution or the like.

The crosslinking process can be performed by immersing the PVA-based film in an aqueous boric acid solution or the like, where in this process, the treatment temperature is usually in a range of 25° C. or higher, 30° C. to 85° C. or 30° C. to 60° C. or so and the treatment time is usually 5 seconds to 800 seconds or 8 seconds to 500 seconds or so.

The stretching process is generally performed by uniaxial stretching. Such stretching may also be performed together with the dyeing and/or crosslinking process. The stretching method is not particularly limited, and for example, a wet stretching method can be applied. In such a wet stretching method, for example, stretching after dyeing is generally performed, but stretching may be performed with crosslinking, and may also be performed several times or in multiple stages.

The iodinated compound such as potassium iodide can be contained in the treatment liquid applied to the wet stretching method, and in this process, a light blocking rate can also be controlled through adjusting the ratio. In the stretching, the treatment temperature is usually in the range of 25° C. or higher, 30° C. to 85° C. or 50° C. to 70° C., and the treatment time is usually 10 seconds to 800 seconds or 30 seconds to 500 seconds, without being limited thereto.

In the stretching process, the total draw ratio can be controlled in consideration of orientation characteristics and the like, and the total draw ratio may be 3 times to 10 times, 4 times to 8 times or 5 times to 7 times or so based on the original length of the PVA-based film, but is not limited thereto. Here, in the case of involving stretching a swelling process or the like other than the stretching process, the total draw ratio may mean the cumulative draw ratio including the stretching in each process. Such a total draw ratio can be adjusted to an appropriate range in consideration of orientation characteristics, processability or stretching cuttability of the polarizer, and the like.

In the production process of the polarizer, in addition to the dyeing, crosslinking and stretching, the swelling process may also be performed before performing the above process. The contamination of the surface of the PVA-based film or an antiblocking agent can be cleaned by swelling, whereby there is also an effect capable of reducing unevenness such as dyeing deviations.

In the swelling process, water, distilled water or pure water, and the like can be usually used. The main component of the relevant treatment liquid is water, and if necessary, an iodinated compound such as potassium iodide or an additive such as a surfactant, or an alcohol, and the like can be included in a small amount. In this process, the above-described light blocking rate can also be controlled through control of process variables.

The treatment temperature in the swelling process is usually 20° C. to 45° C. or 20° C. to 40° C. or so, but is not limited thereto. Since swelling deviations can cause dyeing deviations, process variables can be adjusted so that the occurrence of such swelling deviations is suppressed as much as possible.

If necessary, appropriate stretching can also be performed in the swelling process. The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small, and it can control so that the stretching failure of the film does not occur.

In the production process of the polarizer, metal ion treatment can be performed. This treatment is performed, for example, by immersing the PVA-based film in an aqueous solution containing a metal salt. This allows metal ions to be contained in the polarizer, and in this process, the color tone of the PVA-based polarizer can be controlled by controlling the kind or ratio of metal ions. The applicable metal ions can be exemplified by metal ions of a transition metal such as cobalt, nickel, zinc, chromium, aluminum, copper, manganese or iron, and it may be possible to control the color tone by selecting an appropriate type of these.

In the production process of the polarizer, the cleaning process may proceed after dyeing, crosslinking and stretching. This cleaning process can be performed by a solution of an iodinated compound such as potassium iodide, and in this process, the above-described light blocking rate can be controlled through the concentration of the iodinated compound in the solution or the treatment time of the cleaning process, and the like. Therefore, the concentration of the iodinated compound and the treatment time with the solution can be adjusted in consideration of the light blocking rate. However, the cleaning process may also be performed using water.

Such cleaning with water and cleaning with the iodinated compound solution may also be combined, or a solution in which a liquid alcohol such as methanol, ethanol, isopropyl alcohol, butanol or propanol is blended may also be used.

After these processes, the polarizer can be produced by performing a drying process. The drying process can be performed at an appropriate temperature for an appropriate time, for example, in consideration of the moisture content and the like required for the polarizer, where such conditions are not particularly limited.

In one example, as the polarizer, a polyvinyl alcohol polarizer comprising a potassium component such as potassium ions and a zinc component such as zinc ions may be used for securing durability, particularly high temperature reliability, of the optical laminate. If the polarizer containing such components is used, it is possible to provide an optical laminate in which durability is stably maintained even under high temperature conditions, particularly ultra-high temperature conditions of 100° C. or higher.

The ratio of the potassium and zinc components can be further controlled. For example, in one example, the ratio (K/Zn) of the potassium component (K) to the zinc component (Zn) contained in the polyvinyl alcohol polarizer may be in a range of 0.2 to 6. In another example, the ratio (K/Zn) may be about 0.4 or more, 0.6 or more, 0.8 or more, 1 or more, 1.5 or more, 2 or more, or 2.5 or more, and may be 5.5 or less, about 5 or less, about 4.5 or less, about 4 or less, about 3.5 or less, or about 3 or less or so.

The ratio of the amount of the potassium component contained in the total weight of the polyvinyl alcohol polarizer may be about 0.1 to 2 wt %. In another example, the ratio of the potassium component may be about 0.15 wt % or more, about 0.2 wt % or more, about 0.25 wt % or more, about 0.3 wt % or more, about 0.35 wt % or more, 0.4 wt % or more, or about 0.45 wt % or more, and may be about 1.95 wt % or less, about 1.9 wt % or less, about 1.85 wt % or less, about 1.8 wt % or less, about 1.75 wt % or less, about 1.7 wt % or less, about 1.65 wt % or less, about 1.6 wt % or less, about 1.55 wt % or less, about 1.5 wt % or less, about 1.45 wt % or less, about 1.4 wt % or less, about 1.35 wt % or less, about 1.3 wt % or less, about 1.25 wt % or less, about 1.2 wt % or less, about 1.15 wt % or less, about 1.1 wt % or less, about 1.05 wt % or less, about 1 wt % or less, about 0.95 wt % or less, about 0.9 wt % or less, about 0.85 wt % or less, about 0.8 wt % or less, about 0.75 wt % or less, about 0.7 wt % or less, about 0.65 wt % or less, about 0.6 wt % or less, about 0.55 wt % or less, or about 0.5 wt % or less or so.

The amount of the zinc component may be included in the polyvinyl alcohol may be 0.1 to 0.5 wt % based on a total weight of the polyvinyl alcohol polarizer.

In one example, the ratio of the potassium component to the zinc component may be included so as to satisfy Equation A below.

$$0.70 \text{ to } 0.95 = 1/(1+Q \times d/R) \quad \text{[Equation A]}$$

In Equation A, Q is the ratio (K/Zn) of the molar mass (K, 39.098 g/mol) of the potassium component and the molar mass (Zn, 65.39 g/mol) of the zinc component contained in the polyvinyl alcohol polarizer, d is the thickness (μm)/60 μm of the polyvinyl alcohol polarizer before stretching, R is the ratio (K/Zn) of the weight ratio (K, unit: weight %) of the potassium component and the weight ratio (Zn, unit: weight %) of the zinc component contained in the polyvinyl alcohol polarizer.

By comprising potassium and zinc components in a polarizer in the above manner, it is possible to provide a polarizer having excellent reliability at a high temperature.

The thickness of such a polarizer is not particularly limited, where the polarizer may be formed to have an appropriate thickness depending on the purpose. Typically, the thickness of the polarizer may be in a range of 5 μm to 80 μm, but is not limited thereto. In another example, the thickness may be about 7 μm or more, 9 μm or more, 11 μm or more, or 13 μm or more, or may be about 75 μm or less, 70 μm or less, 65 μm or less, 60 μm or less, 55 μm or less, 50 μm or less, 45 μm or less, 40 μm or less, 35 μm or less, or 30 μm or less.

The optical laminate of the present application may comprise a pressure-sensitive adhesive layer formed on one side or both sides of the optical film. Such a pressure-sensitive adhesive layer comprises a pressure-sensitive adhesive polymer. The pressure-sensitive adhesive layer may comprise the pressure-sensitive adhesive polymer as a main component. That is, the content ratio of the pressure-sensitive adhesive polymer relative to the total weight of the pressure-sensitive adhesive layer may be 50 wt % or more, 55 wt % or more, 60 wt % or more, 65 wt % or more, 70 wt % or more, 75 wt % or more, 80 wt % or more, 85 wt % or more, or 90 wt % or more. The upper limit of the ratio is not particularly limited, which may be, for example, about 98 wt % or less, or 95 wt % or less. Such a pressure-sensitive adhesive polymer may be contained in the pressure-sensitive adhesive layer in a state of being crosslinked by a cross-linking agent as described below.

The properties of the pressure-sensitive adhesive layer can be controlled in order to ensure excellent durability under high temperature conditions, particularly, ultra-high temperature conditions of 100° C. or higher, and to suppress or prevent foaming phenomena or the like even when applied to an optical film having low moisture permeability.

Hereinafter, among physical properties mentioned in this specification, when the measured temperature and/or pressure affects the physical properties, the relevant physical properties means physical properties measured at room temperature and/or normal pressure, unless otherwise specified.

In the present application, the term room temperature is a natural temperature without warming or cooling, which may mean, for example, any one temperature in a range of about 10° C. to 30° C., or a temperature of about 25° C. or 23° C. or so.

In the present application, the term normal pressure is a pressure at the time of being not particularly reduced or increased, which may be usually one atmosphere or so, such as atmospheric pressure.

In one example, the pressure-sensitive adhesive layer may exhibit a gel fraction in a predetermined range. For example, the pressure-sensitive adhesive layer may have a gel fraction of about 80 wt % or more as calculated by Equation 1 below.

$$\text{Gel fraction} = B/A \times 100 \quad \text{[Equation 1]}$$

In Equation 1, A is the mass (unit: g) of the pressure-sensitive adhesive layer before immersing it in ethyl acetate, and B represents the dry mass (unit: g) of the insoluble fraction recovered after immersing the pressure-sensitive adhesive layer in ethyl acetate at room temperature for 24 hours. At this time, the insoluble fraction means a component which is filtered through a 200 mesh sieve, and the dry mass of the insoluble fraction means a mass measured in a state where the solvent is not substantially contained in the relevant insoluble fraction by drying the collected insoluble fraction under an appropriate condition, for example, in a state where a solvent content is about 1 wt % or less, 0.5 wt % or less, or 0.1 wt % or less. Here, the drying condition is not particularly limited as long as the ratio of the solvent contained in the insoluble fraction can be controlled within the above range, and it can be performed under an appropriate condition.

In another example, the gel fraction may be about 81 wt % or more, or about 82 wt % or more, or may be about 95 wt % or less, or 90 wt % or less.

The pressure-sensitive adhesive layer may have a storage elastic modulus at room temperature of about 0.07 MPa or more. In another example, the storage modulus may be about 0.071 MPa or more, about 0.072 MPa or more, about 0.073 MPa or more, about 0.074 MPa or more, 0.075 MPa or more, 0.08 MPa or more, 0.085 MPa or more, or 0.09 MPa or more, and may be 0.2 MPa or less, 0.15 MPa or less, 0.12 MPa or less, about 0.115 MPa or less, or about 0.11 MPa or less or so. The storage elastic modulus (G') can be obtained using a dynamic rheometer, and for example, the storage elastic modulus at room temperature (about 23° C.) can be obtained in a state of setting the measurement mode to the shear mode and setting the measurement frequency to about 1 Hz or so.

The pressure-sensitive adhesive layer may have room temperature peel force of about 700 gf/25 mm or more as measured on a glass substrate at a peel rate of 300 mm/min and a peel angle of 90 degrees. The peel force may be about 750 gf/25 mm or more, about 800 gf/25 mm or more, about 850 gf/25 mm or more, about 900 gf/25 mm or more, about 950 gf/25 mm or more. The upper limit of the peeling force is not particularly limited, and for example, the peel force may be about 2,000 gf/25 mm or less, about 1,800 gf/25 mm or less, or about 1,500 gf/25 mm or less.

The pressure-sensitive adhesive layer exhibiting the above characteristics can ensure excellent durability under high temperature conditions, particularly, ultra-high temperature conditions of 100° C. or higher, and can suppress or prevent foaming phenomena or the like even when applied to an optical film having low moisture permeability.

In order to form the pressure-sensitive adhesive layer having such characteristics, the monomer composition, molecular weight characteristics, degree of crosslinking, etc. of the above-mentioned pressure-sensitive adhesive polymer can be controlled.

In one example, one or two or more of the above-mentioned physical properties may enable the formation of the intended pressure-sensitive adhesive layer in association with the composition and the like of the polymer to be described below.

As the pressure-sensitive adhesive polymer, a polymer having a weight average molecular weight (Mw) of 500,000 or more can be used. In the present application, the term "weight average molecular weight" is a numerical value in terms of standard polystyrene measured by GPC (gel permeation chromatograph), which may also be simply referred to as molecular weight, unless otherwise specified. In another example, the molecular weight (Mw) may be about 600,000 or more, about 700,000 or more, about 800,000 or more, about 900,000 or more, about 1,000,000 or more, about 1,100,000 or more, about 1,200,000 or more, about 1,300,000 or more, about 1,400,000 or more, or about 1,500,000 or more, or may be about 3,000,000 or less, about 2,800,000 or less, about 2,600,000 or less, about 2,400,000 or less, about 2,200,000 or less, or about 2,000,000 or less.

The pressure-sensitive adhesive polymer may be an acrylic pressure-sensitive adhesive polymer. The term acrylic adhesive polymer may mean, as one having a property capable of forming a pressure-sensitive adhesive, a polymer comprising an acrylic monomer unit as a main component. The term acrylic monomer may mean acrylic acid, methacrylic acid or a derivative of acrylic acid or methacrylic acid such as (meth)acrylic acid ester. Here, the phrase being included as a main component may also mean a case where the ratio of the relevant component is 55% or more, 60% or more, 65% or more, 70% or more, 75% or more, 80% or more, 85% or more, 90% or more, or 95% or more on the basis of weight. The upper limit of the ratio may be 100%. In addition, the unit contained in the polymer means a state where the monomer forms a main chain and/or a side chain of the polymer through a polymerization reaction.

The pressure-sensitive adhesive polymer may comprise (1) an alkyl (meth)acrylate unit having an alkyl group having 4 or more carbon atoms, (2) an alkyl (meth)acrylate unit having an alkyl group having 3 or less carbon atoms, (3) an aromatic group-containing monomer unit and (4) a polar group-containing monomer unit. Such a monomer composition is associated with physical properties of a pressure-sensitive adhesive layer, which are described below, such as gel fraction and peel force, so that the pressure-sensitive adhesive layer can excellently maintain re-workability, cutting ability, lifting and foam inhibiting ability, and the like as well as represent excellent high temperature durability.

Here, as the unit (1), an alkyl (meth)acrylate unit having an alkyl group with 4 or more carbon atoms, for example, an alkyl group with 4 to 14 carbon atoms can be used in consideration of cohesive force, glass transition temperature or adhesion of the pressure-sensitive adhesive, and the like. Such an alkyl (meth)acrylate can be exemplified by n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl(meth)acrylate, lauryl (meth)acrylate and tetradecyl (meth)acrylate, and the like, and one or two or more of the foregoing can be applied. Generally, n-butyl acrylate or 2-ethylhexyl acrylate, and the like are used.

The ratio of the amount of the unit (1) in the total weight of the polymer is not particularly limited, but may be in a range of about 50 to 70 wt %. In another example, the ratio may be about 51 wt % or more, about 52 wt % or more, about 53 wt % or more, or about 54 wt % or more, or may be about 69 wt % or less, 68 wt % or less, 67 wt % or less, 66 wt % or less, 65 wt % or less, or about 64 wt % or less.

As the unit (2), an alkyl (meth)acrylate unit having an alkyl group with 3 or less carbon atoms is used. Such a unit makes it possible that the pressure-sensitive adhesive ensures good endurance reliability at a high temperature. The monomer capable of forming the unit can be exemplified by methyl (meth)acrylate, ethyl (meth)acrylate, n-propyl (meth)acrylate or isopropyl (meth)acrylate, and the like, and a suitable example is methyl acrylate.

The unit (2) may be included in the polymer in a ratio of about 30 to 65 parts by weight relative to 100 parts by weight of the unit (1). In another example, the ratio may be about 64 parts by weight or less, about 63 parts by weight or less, about 62 parts by weight or less, about 61 parts by weight or less, about 60 parts by weight or less, about 59 parts by weight or less, about 58 parts by weight or less, about 57 parts by weight or less, or 56 parts by weight or less.

As the unit (3), a unit of an aromatic group-containing monomer, for example, a unit of a (meth)acrylate-based monomer having an aromatic ring is used.

The kind of the aromatic group-containing monomer capable of forming such a unit is not particularly limited, and for example, a monomer of Formula 1 below can be exemplified.

[Formula 1]

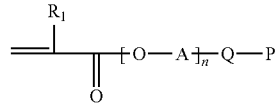

In Formula 1, $R_1$ represents hydrogen or alkyl, A represents alkylene, n represents an integer in a range of 0 to 3, Q represents a single bond, —O—, —S— or alkylene, and P represents an aromatic ring.

In Formula 1, a single bond means a case where the atomic groups on both sides are directly bonded to each other without mediating a separate atom.

In Formula 1, $R_1$ may be, for example, hydrogen or alkyl of 1 to 4 carbon atoms, or may be hydrogen, methyl or ethyl.

In the definition of Formula 1, A may be alkylene of 1 to 12 carbon atoms or 1 to 8 carbon atoms, and for example, may be methylene, ethylene, hexylene or octylene.

In Formula 1, n may be, for example, a number in the range of 0 to 2, or may be 0 or 1.

In Formula 1, Q may be a single bond, —O— or —S—.

In Formula 1, P is a substituent derived from an aromatic compound, which may be, for example, a functional group derived from an aromatic ring having 6 to 20 carbon atoms, for example, phenyl, biphenyl, naphthyl or anthracenyl.

In Formula 1, the aromatic ring may be optionally substituted by one or more substituents, where a specific example of the substituent may include halogen or alkyl, or halogen or alkyl of 1 to 12 carbon atoms, or chlorine, bromine, methyl, ethyl, propyl, butyl, nonyl or dodecyl, but is not limited thereto.

In one example, as the compound of Formula 1, a compound, wherein in Formula 1, $R_1$ is hydrogen or alkyl having 1 to 4 carbon atoms, n is 1, A is an alkylene group having 1 to 4 carbon atoms, Q is a single bond and P is an aromatic ring (aryl group) having 6 to 12 carbon atoms, can be used.

A specific example of the compound of Formula 1 may include one or a mixture of two or more of phenoxyethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth)acrylate, 2,6-dibromo-4-dodecylphenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate, but is not limited thereto.

The unit (3) may be included in the polymer in a ratio of about 20 to 45 parts by weight relative to 100 parts by weight of the unit (1). In another example, the ratio may be about 21 parts by weight or more, about 22 parts by weight or more, or about 23 parts by weight or more, or may be about 44 parts by weight or less, about 43 parts by weight or less, about 42 parts by weight or less, about 41 parts by weight or less, about 40 parts by weight or less, about 39 parts by weight or less, about 38 parts by weight or less, about 37 parts by weight or less, about 36 parts by weight or less, about 35 parts by weight or less, about 30 parts by weight or less, about 29 parts by weight or less, or about 28 parts by weight or less.

As the unit (4), a unit of a monomer having a hydroxyl group or a carboxyl group as a polar group may be used. Such a unit may serve to impart cohesive force or the like through a reaction with a cross-linking agent or the like, which is described below, if necessary. As the monomer having a polar group, hydroxyalkyl (meth)acrylate having a hydroxyalkyl group having a carbon number in a range of 3 to 6 or a carboxyl group-containing monomer may be used for ensuring adequate high temperature reliability and the like.

The hydroxyalkyl (meth)acrylate having a hydroxyalkyl group having a carbon atom in the range of 3 to 6 can be exemplified by 3-hydroxypropyl (meth)acrylate, 4-hydroxybutyl (meth)acrylate or 6-hydroxyhexyl (meth)acrylate, and the like, and in one example, 4-hydroxybutyl (meth)acrylate can be used.

The carboxyl group-containing monomer can be exemplified by (meth)acrylic acid, 2-(meth)acryloyloxyacetic acid, 3-(meth)acryloyloxypropyl acid, 4-(meth)acryloyloxybutyric acid, an acrylic acid dimer, itaconic acid, maleic acid and maleic anhydride, and the like, and generally, acrylic acid can be applied.

However, in the case where the pressure-sensitive adhesive layer is used adjacent to an electrode such as ITO (indium tin oxide), if a large amount of carboxyl groups are contained in the pressure-sensitive adhesive layer, they may cause corrosion of the electrode to adversely affect the performance of the device, so that a component having a carboxyl group may not be applied, or it may be necessary to limit the application ratio.

The unit (4) may be included in the polymer in a ratio of about 1 to 4.5 parts by weight relative to 100 parts by weight of the unit (1). In another example, the ratio may be about 1.1 parts by weight or more, about 1.2 parts by weight or more, about 1.3 parts by weight or more, about 1.4 parts by weight or more, or about 1.5 parts by weight or more, or may be about 4.4 parts by weight or less, about 4.3 parts by weight or less, about 4.2 parts by weight or less, about 4.1 parts by weight or less, about 4 parts by weight or less, about 3.9 parts by weight or less, about 3.8 parts by weight or less, about 3.7 parts by weight or less, about 3.6 parts by weight or less, about 3.5 parts by weight or less, about 3.4 parts by weight or less, about 3.3 parts by weight or less, or about 3.2 parts by weight or less. In particular, when the unit (4) is a carboxyl group-containing monomer unit, the ratio may be about 1 part by weight or more, or about 1.5 parts by weight or more, or may be about 4.5 parts by weight or less, about 4 parts by weight or less, about 3.5 parts by weight or less, about 3 parts by weight or less, about 2.5 parts by weight or less, or about 2 parts by weight or less, relative to 100 parts by weight of the unit (1).

As the pressure-sensitive adhesive polymer contains the above-mentioned monomer units and, if necessary, the ratio thereof is adjusted, stable durability at a high temperature is ensured in the pressure-sensitive adhesive layer and other physical properties required for the pressure-sensitive adhesive layer are also stably maintained, where even in the case of being disposed adjacent to the electrode, corrosion of the relevant electrode or the like cannot be caused.

The pressure-sensitive adhesive polymer may further comprise other known units in addition to the above-mentioned units, if necessary.

Such a pressure-sensitive adhesive polymer may be prepared by a known polymerization method applying the above-mentioned monomers.

The pressure-sensitive adhesive layer may further comprise an ionic compound in addition to the polymer. By applying an ionic compound, appropriate conductivity can be imparted to the pressure-sensitive adhesive layer depending on the application.

As the ionic compound, a known organic salt may be used. In one example, as the organic salt, a salt containing a cation represented by Formula 2 below can be used.

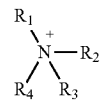

[Formula 2]

In Formula 2, $R_1$ is an alkyl group having 1 to 3 carbon atoms, and $R_2$ to $R_4$ are each independently an alkyl group having 4 to 20 carbon atoms.

In Formula 2, the alkyl group of $R_1$ to $R_4$ may be linear, branched or cyclic, and may be suitably linear. Also, the alkyl group may be optionally substituted by a substituent such as another alkyl group.

In another example, $R_2$ to $R_4$ in Formula 2 may be each independently an alkyl group having 4 to 16 carbon atoms, 4 to 12 carbon atoms, or 4 to 8 carbon atoms.

The cation has a structure in which a nitrogen atom is bonded to four alkyl groups and three of the alkyl groups are long chain alkyl groups having 4 or more carbon atoms, where the cation having such a structure is advantageous in securing an octanol-water partition coefficient and binding energy with water in the above-described range.

The cation of the Formula 2 can be exemplified by N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, and the like, but is not limited thereto.

As an anion included in the ionic compound, for example, $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzonate ($C_6H_5COO^-$), acetate ($CH_3COO^-$), triflouroacetate ($CF_3COO^-$), tetrafluoroborate ($BF_4^-$), tetrabenzylborate ($B(C_6H_5)_4^-$) or trispentafluoroethyl trifluorophosphate ($P(C_2F_5)_3F_3^-$), and the like can be used without particular limitation.

In one example, the ionic compound may also comprise an anion represented by Formula 3 below or bisfluorosulfonylimide, and the like.

$$[X(YO_mR_f)_n]^- \qquad \text{[Formula 3]}$$

In Formula 3, X is a nitrogen atom or a carbon atom, Y is a carbon atom or a sulfur atom, $R_f$ is a perfluoroalkyl group, m is 1 or 2, and n is 2 or 3.

In Formula 3, when Y is carbon, m may be 1; when Y is sulfur, m may be 2; when X is nitrogen, n may be 2; and when X is carbon, n may be 3.

The anion of Formula 3 or bis(fluorosulfonyl)imide exhibits high electronegativity due to the perfluoroalkyl group ($R_f$) or the fluorine group, and also contains a unique resonance structure to have hydrophobicity while forming a weak bond with the cation. Accordingly, the ionic compound can exhibit excellent compatibility with other components, such as a polymer, of the composition, as well as give high antistatic property even in a small amount.

$R_f$ in Formula 3 may be a perfluoroalkyl group having 1 to 20 carbon atoms, 1 to 12 carbon atoms, 1 to 8 carbon atoms or 1 to 4 carbon atoms, where the perfluoroalkyl group may have a linear, branched or cyclic structure. The anion of Formula 3 may be a sulfonylmethide-based, sulfonylimide-based, carbonylmethide-based or carbonylimide-based anion, and specifically, may be one or a mixture of two or more of tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanesulfonylimide or bispentafluoroethanecarbonylimide, and the like.

The ratio of the ionic compound in the crosslinkable composition is not particularly limited, which may be adjusted to an appropriate range in consideration of the desired antistatic property. In one example, the ionic compound may be used in an amount of 0.001 parts by weight to 10 parts by weight relative to 100 parts by weight of the adhesive polymer.

On the other hand, in the present application, the pressure-sensitive adhesive layer does not substantially contain a metal salt. In the present application, the fact that the pressure-sensitive adhesive layer does not contain a metal salt means the case where the ratio of the amount of the metal salt in the total weight of the pressure-sensitive adhesive layer is about 1 wt % or less, about 0.5 wt % or less, about 0.1 wt % or less, or about 0.05 wt % or less, or substantially 0 wt %. By applying no metal salt as such, it is possible to provide a pressure-sensitive adhesive layer without white turbidity.

The pressure-sensitive adhesive layer may further comprise a crosslinking agent, where the crosslinking agent may crosslink the pressure-sensitive adhesive polymer.

As the crosslinking agent, a known crosslinking agent may be used without any particular limitation, and for example, an isocyanate crosslinking agent, an epoxy crosslinking agent, an aziridine crosslinking agent and a metal chelating crosslinking agent, and the like may be used.

As the isocyanate crosslinking agent, a diisocyanate such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a reaction product of one or more of the diisocyanates with a polyol (e.g., trimethylol propane), and the like can be used.

As the epoxy crosslinking agent, one or more selected from the group consisting of ethylene glycol diglycidyl ether, triglycidyl ether, trimethylolpropane triglycidyl ether, N,N,N',N'-tetraglycidylethylenediamine and glycerin diglycidyl ether can be used; as the aziridine crosslinking agent, one or more selected from the group consisting of N,N-toluene-2,4-bis(1-aziridinecarboxamide), N,N'-diphenylmethane-4,4-bis(1-aziridinecarboxamide), triethylenemelamine, bisisophthaloyl-1-(2-methylaziridine) and tri-1-aziridinylphosphine oxide can be used; and as the metal chelating crosslinking agent, a compound in which a polyvalent metal such as aluminum, iron, zinc, tin, titanium, antimony, magnesium and/or vanadium is coordinated to acetylacetone or ethyl acetoacetate, and the like can be used, without being limited thereto.

The crosslinking agent can be used in an amount of 0.001 parts by weight to 10 parts by weight relative to 100 parts by weight of the pressure-sensitive adhesive polymer, and under this ratio, it is possible to prevent deterioration of endurance reliability such as occurrence of interlayer peeling or a lifting phenomenon, and the like, while appropriately maintaining cohesive force of the pressure-sensitive adhesive.

In another example, the ratio may be about 0.005 parts by weight or more, 0.01 parts by weight or more, 0.05 parts by weight or more, or 0.1 parts by weight or more, and may be about 9 parts by weight or less, 8 parts by weight or less, 7 parts by weight or less, 6 parts by weight or less, 5 parts by weight or less, 4 parts by weight or less, 3 parts by weight or less, 2 parts by weight or less, or 1.5 parts by weight or less.

The pressure-sensitive adhesive layer may further comprise other known additives as needed, in addition to the above-mentioned components. Such an additive can be exemplified by one or more selected from the group consisting of a coupling agent such as a silane coupling agent; an antistatic agent; a tackifier; an ultraviolet stabilizer; an antioxidant; a colorant; a reinforcing agent; a filler; a defoamer; a surfactant; a photopolymerizable compound such as a multifunctional acrylate; and a plasticizer, but is not limited thereto.

The present application also relates to a display device comprising such an optical laminate. The device may comprise, for example, a display panel to which the optical laminate is attached via the above-mentioned pressure-sensitive adhesive layer. Here, the type of the display panel is not particularly limited, which may be, for example, a known LCD panel or OLED panel, and the like. Furthermore, the position or the like where the optical laminate is attached to the panel can also follow a known manner.

Advantageous Effects

The present application relates to an optical laminate. The present application can provide an optical laminate that stable durability is secured even at a high temperature, particularly an ultra-high temperature of about 100° C. or higher, no white turbidity is caused, other physical properties required for the optical laminate are also excellent, and even in the case of being disposed adjacent to the electrode, corrosion of the relevant electrode or the like is not induced.

MODE FOR INVENTION

Hereinafter, the present application will be specifically described by way of examples, but the scope of the present application is not limited by the following examples.

1. Method of Measuring Peel Force

The pressure-sensitive adhesive polarizing plates prepared in Examples or Comparative Examples were each cut to a width of 25 mm and a height of 200 mm to prepare a specimen, which was attached to a glass plate via the pressure-sensitive adhesive layer of the specimen. The peel force was measured while peeling off the pressure-sensitive adhesive polarizing plate at a peel angle of 90 degree and a peel rate of 300 mm/min at an elapsed time of 1 hour after attachment of the specimen.

2. Method of Measuring Gel Fraction

After holding each of the pressure-sensitive adhesive layers prepared in Examples or Comparative Examples at a constant temperature and humidity room (23° C., 50% relative humidity) for 7 days, 0.2 g (=A in gel fraction measurement equation) was collected. The collected pressure-sensitive adhesive layer was completely immersed in 50 mL of ethyl acetate, and then stored in a dark room at room temperature for 1 day. Subsequently, a portion (insoluble fraction) not dissolved in ethyl acetate was collected in a #200 stainless steel wire net and dried at 150° C. for 30 minutes to measure the mass (dry mass of insoluble fraction=B in gel fraction measurement equation). Subsequently, the gel fraction (unit: %) was measured by substituting the measurement result into the following equation.

<Gel Fraction Measurement Equation>

Gel fraction=$B/A \times 100$

A: mass of the pressure-sensitive adhesive (0.2 g)
B: dry mass of insoluble fraction (unit: g)

3. Method of Measuring Elastic Modulus

The pressure-sensitive adhesive compositions prepared in Examples or Comparative Examples were each coated between two release films and aged for 7 days under a constant temperature and humidity condition (23° C., 50% R.H.) to prepare a pressure-sensitive adhesive layer having a thickness of about 22 μm. Subsequently, the pressure-sensitive adhesive between the release films was cut to prepare a circumferential specimen of 8 mm×1 mm (=diameter×thickness), and then using a dynamic rheometer (ARES, RDA, TA Instruments Inc.), the storage elastic modulus, loss elastic modulus and loss tangent at room temperature (23° C.) were measured while applying shear stress between parallel plates at a frequency of 1 Hz.

4. ITO Corrosion Test (Resistance Change Rate)

The pressure-sensitive adhesive compositions prepared in Examples or Comparative Examples were each laminated on a TAC (triacetyl cellulose) film having a thickness of 40 μm and aged for 7 days under a constant temperature and humidity condition (23° C., 50% relative humidity) to prepare a specimen. A typical ITO (indium tin oxide) film was cut to have a width of about 50 mm or so and a height of about 30 mm, on which a silver paste was applied to both ends in the transverse direction at a width of 10 mm or so, respectively. Subsequently, the specimen was cut to have a width of about 40 mm or so and a height of about 30 mm or so, and the pressure-sensitive adhesive layer was attached to the ends on the silver paste at an interval of 5 mm or so to prepare a sample. The prepared sample was stored for 250 hours under a high temperature and humidity condition (85° C., 85% relative humidity), and then the change rate of resistance was evaluated with a linear resistance meter (Hioki 3244-60 card hitester) as compared with before initial introduction to determine whether or not the ITO was corroded.

5. High Temperature Durability (Lifting, Peeling and Foaming Evaluation)

The pressure-sensitive adhesive polarizing plates of Examples or Comparative Examples were each cut to have a width of about 140 mm or so and a height of about 90 mm or so to prepare a specimen, which was attached to a glass substrate at a pressure of 5 kg/cm². The attachment was performed in a clean room so that bubbles or foreign materials were not generated. Subsequently, the prepared sample was kept in an autoclave for 15 minutes under conditions of 50° C. and 5 kg/cm².

After maintaining the sample at a temperature of about 100° C. for about 500 hours, the durability was evaluated according to the following criteria.

<Evaluation Criteria>
O: no bubbling and peeling occurred
Δ: bubbling and/or peeling occurred
X: severe bubbling and/or peeling occurred 6. White Turbidity Evaluation Pressure-sensitive adhesive compositions of Examples or Comparative Examples are each applied on a release film and dried to form a pressure-sensitive adhesive layer, and another release film is attached on the formed pressure-sensitive adhesive layer to produce an NCF (non-carrier film) type pressure-sensitive adhesive film. The pressure-sensitive adhesive film was held in a constant temperature and humidity chamber (23° C., 50% relative humidity) for 7 days, and then one of the release films was peeled off, and a distilled water droplet was dropped onto the exposed pressure-sensitive adhesive layer and it was evaluated whether or not a white turbidity phenomenon, in which the dropped distilled water droplet became cloudy, occurred.

<Evaluation Criteria>
O: no white turbidity
X: white turbidity occurred

PREPARATION EXAMPLE 1

Preparation of Pressure-Sensitive Adhesive Polymer (A)

n-Butyl acrylate (n-BA), benzyl acrylate (BzA), methyl acrylate (MA) and hydroxybutyl acrylate (4-HBA) were introduced into an 1 L reactor equipped with a cooling device for nitrogen gas refluxing and easy temperature control in a weight ratio of 64:15:20:1 (n-BA:BzA:MA:4-HBA) and 100 parts by weight of ethyl acetate (EAc) was introduced as a solvent. Subsequently, nitrogen gas was purged for 1 hour to remove oxygen, and then, 0.03 parts by weight of azobisisobutyronitrile (AIBN) diluted to a concentration of 50 wt % in ethyl acetate was introduced as a reaction initiator and reacted for 8 hours to prepare a copolymer (A) having a molecular weight (Mw) of about 1,800,000 or so.

PREPARATION EXAMPLE 2

Preparation of Pressure-Sensitive Adhesive Polymers B to G

Copolymers were prepared by the method according to Preparation Example 1 above, while adopting the compositions shown in Table 1 below.

TABLE 1

| | Preparation Example | | | | | | |
|---|---|---|---|---|---|---|---|
| | 1<br>A | 2<br>B | 3<br>C | 4<br>D | 5<br>E | 6<br>F | 7<br>G |
| n-BA | 64 | 54 | 63 | 64 | 81 | 84 | 84 |
| BzA | 15 | 15 | 15 | 15 | 15 | 15 | 15 |
| MA | 20 | 30 | 20 | 20 | | | |
| 4-HBA | 1 | 1 | 2 | | | 1 | |
| AA | | | | 1 | 4 | | 1 |
| Mw | 1,800,000 | 1,850,000 | 1,800,000 | 1,650,000 | 1,300,000 | 1,500,000 | 1,650,000 |

Content unit: part by weight,
n-BA: n-butyl acrylate,
BzA: benzyl acrylate,
MA: methyl acrylate,
4-HBA: 4-hydroxybutyl acrylate,
AA: acrylic acid,
Mw: weight average molecular weight

EXAMPLE 1

Preparation of Pressure-Sensitive Adhesive Composition

An isocyanate crosslinking agent (T-39M, Japan Soken Co., Ltd.) was combined to the copolymer (A) of Preparation Example 1 in an amount of about 0.12 parts by weight relative to 100 parts by weight of the solid content of the copolymer (A), an organic salt (3M Co., FC-4400A) was also combined thereto in a ratio of about 1.0 part by weight relative to 100 parts by weight of the solid content of the copolymer (A), and the mixture was diluted to an appropriate concentration and uniformly mixed, and then coated on a release paper and dried to produce a uniform pressure-sensitive adhesive layer having a thickness of 22 μm.

Production of Polarizing Plate

A polyvinyl alcohol (PVA) film (Japan Synthetic Co., M2004) having a thickness of about 30 μm was immersed in a dyeing solution at 30° C. containing 0.05 wt % of iodine and 1.5 wt % of potassium iodide for 60 seconds to be subjected to dyeing. Subsequently, the dyed polyvinyl alcohol film was immersed in a crosslinking solution at 30° C. containing 0.5 wt % of boron and 3.0 wt % of potassium iodide for 60 seconds to be subjected to crosslinking. Thereafter, the crosslinked polyvinyl alcohol film was stretched at a draw ratio of 5.5 times using a roll-to-roll stretching method. The stretched polyvinyl alcohol film was washed with water by immersing it in ion-exchanged water at 30° C. for 20 seconds and immersed in a solution at 30° C. containing 1.5 wt % of zinc nitrate and 4.0 wt % of potassium iodide for 10 seconds. Thereafter, the polyvinyl alcohol film was dried at a temperature of 80° C. for 200 seconds to produce a polarizer. The potassium content in the produced polarizer was about 0.47 wt %, and the zinc content was about 0.17 wt %. Subsequently, a polarizing plate was prepared by attaching a known TAC (triacetyl cellulose) protective film to both sides of the prepared polarizer.

Production of Optical Laminate (Pressure-Sensitive Adhesive Polarizing Plate)

The polarizing plate was stuck and processed to one side of the prepared pressure-sensitive adhesive layer to produce a pressure-sensitive polarizing plate (optical laminate).

EXAMPLE 2

A crosslinking agent (T-39M, Japan Soken Co., Ltd.) was combined to the copolymer (B) of Preparation Example 2 in an amount of about 0.12 parts by weight relative to 100 parts by weight of the solid content of the copolymer (B), the same organic salt as that of Example 1 was combined thereto in an amount of about 1.0 part by weight relative to 100 parts by weight of the solid content of the copolymer (B), and a pressure-sensitive adhesive composition and a pressure-sensitive polarizing plate were prepared in the same manner as in Example 1.

EXAMPLE 3

A crosslinking agent (T-39M, Japan Soken Co., Ltd.) was combined to the copolymer (C) of Preparation Example 3 in an amount of about 0.12 parts by weight relative to 100 parts by weight of the solid content of the copolymer (C), the same organic salt as that of Example 1 was combined thereto in an amount of about 1.0 part by weight relative to 100 parts by weight of the solid content of the copolymer (C), and a pressure-sensitive adhesive composition and a pressure-sensitive polarizing plate were prepared in the same manner as in Example 1.

EXAMPLE 4

A toluene diisocyanate crosslinking agent (T-706BB, Japan Soken Co., Ltd.) was combined to the copolymer (D) of Preparation Example 4 in an amount of about 1 part by weight relative to 100 parts by weight of the solid content of the copolymer (D), an epoxy crosslinking agent (T-743L, Japan Soken Co., Ltd.) was combined thereto in an amount of about 0.005 parts by weight relative to 100 parts by weight of the solid content of the copolymer (D), the same organic salt as that of Example 1 was combined thereto in an amount of about 1.0 part by weight relative to 100 parts by weight of the solid content of the copolymer (D), and a pressure-sensitive adhesive composition and a pressure-sensitive polarizing plate were prepared in the same manner as in Example 1.

COMPARATIVE EXAMPLE 1

A toluene diisocyanate crosslinking agent (T-706BB, Japan Soken Co., Ltd.) was combined to the copolymer (E) of Preparation Example 5 in an amount of about 1.7 parts by weight relative to 100 parts by weight of the solid content of the copolymer (E), an epoxy crosslinking agent (T-743L, Japan Soken Co., Ltd.) was combined thereto in an amount of about 0.005 parts by weight relative to 100 parts by weight of the solid content of the copolymer (E), an inorganic salt (3M Co., HQ-115A) was combined thereto in an amount of about 0.7 parts by weight relative to 100 parts by weight of the solid content of the copolymer (E), and a pressure-sensitive adhesive composition and a pressure-sensitive polarizing plate were prepared in the same manner as in Example 1.

COMPARATIVE EXAMPLE 2

A crosslinking agent (T-39M, Japan Soken Co., Ltd.) was combined to the copolymer (F) of Preparation Example 6 in an amount of about 0.08 part by weight relative to 100 parts by weight of the solid content of the copolymer (F), the same inorganic salt (3M Co., HQ-115A) as that of Comparative Example 1 was combined thereto in an amount of about 0.7 parts by weight relative to 100 parts by weight of the solid content of the copolymer (F), and a pressure-sensitive adhesive composition and a pressure-sensitive polarizing plate were prepared in the same manner as in Example 1.

COMPARATIVE EXAMPLE 3

A crosslinking agent (T-39M, Japan Soken Co., Ltd.) was combined to the copolymer (A) of Preparation Example 1 in an amount of about 0.08 parts by weight relative to 100 parts by weight of the solid content of the copolymer (A), the same organic salt as that of Example 1 was combined thereto in an amount of about 1.0 part by weight relative to 100 parts by weight of the solid content of the copolymer (A), and a pressure-sensitive adhesive composition and a pressure-sensitive polarizing plate were prepared in the same manner as in Example 1.

COMPARATIVE EXAMPLE 4

A toluene diisocyanate crosslinking agent (T-706BB, Japan Soken Co., Ltd.) was combined to the copolymer (G) of Preparation Example 7 in an amount of about 1 part by weight relative to 100 parts by weight of the solid content of the copolymer (G), an epoxy crosslinking agent (T-743L, Japan Soken Co., Ltd.) was combined thereto in an amount of about 0.005 parts by weight relative to 100 parts by weight of the solid content of the copolymer (G), the same organic salt as that of Example 1 was combined thereto in an amount of about 1.0 part by weight relative to 100 parts by weight of the solid content of the copolymer (G), and a pressure-sensitive adhesive composition and a pressure-sensitive polarizing plate were prepared in the same manner as in Example 1.

COMPARATIVE EXAMPLE 5

A toluene diisocyanate crosslinking agent (T-706BB, Japan Soken Co., Ltd.) was combined to the copolymer (A) of Preparation Example 1 in an amount of about 0.08 parts by weight relative to 100 parts by weight of the solid content of the copolymer (D), the same inorganic salt (3M Co., HQ-115A) as that of Comparative Example 1 was combined thereto in an amount of about 0.7 parts by weight relative to 100 parts by weight of the solid content of the copolymer (F), and a pressure-sensitive adhesive composition and a pressure-sensitive polarizing plate were prepared in the same manner as in Example 1

COMPARATIVE EXAMPLE 6

A toluene diisocyanate crosslinking agent (T-706BB, Japan Soken Co., Ltd.) was combined to the copolymer (E) of Preparation Example 5 in an amount of about 0.08 part by weight relative to 100 parts by weight of the solid content of the copolymer (E), the same organic salt as that of Example 1 was combined thereto in an amount of about 1.5 parts by weight relative to 100 parts by weight of the solid content of the copolymer (E), and a pressure-sensitive adhesive composition and a pressure-sensitive polarizing plate were prepared in the same manner as in Example 1.

COMPARATIVE EXAMPLE 7

A toluene diisocyanate crosslinking agent (T-706BB, Japan Soken Co., Ltd.) was combined to the copolymer (D) of Preparation Example 4 in an amount of about 0.8 parts by weight relative to 100 parts by weight of the solid content of the copolymer (D), the same organic salt as that of Example 1 was combined in an amount of about 1.5 parts by weight relative to 100 parts by weight of the solid content of the copolymer (D), and a pressure-sensitive adhesive composition and a pressure-sensitive polarizing plate were prepared in the same manner as in Example 1.

The evaluation results of Examples and Comparative Examples above were summarized and described in Tables 2 and 3 below.

TABLE 2

| | Example | | | |
|---|---|---|---|---|
| | 1 | 2 | 3 | 4 |
| Peel force (gf/25 mm) | 850 | 1000 | 750 | 1000 |
| Gel fraction (wt %) | 82 | 83 | 83 | 85 |
| Elastic modulus (MPa) | 0.072 | 0.09 | 0.091 | 0.105 |
| High temperature durability | ○ | ○ | ○ | ○ |
| ITO corrosion (resistance change rate) | 20% | 15% | 13% | 80% |
| White turbidity | ○ | ○ | ○ | ○ |

TABLE 3

| | Comparative Example | | | | | | |
|---|---|---|---|---|---|---|---|
| | 1 | 2 | 3 | 4 | 5 | 6 | 7 |
| Peel force (gf/25 mm) | 900 | 500 | 900 | 700 | 800 | 450 | 950 |
| Gel fraction (wt %) | 80 | 72 | 76 | 76 | 73 | 72 | 72 |
| Elastic modulus (MPa) | 0.088 | 0.044 | 0.063 | 0.08 | 0.063 | 0.044 | 0.082 |
| High temperature durability | Δ | X | Δ | X | Δ | X | X |
| ITO corrosion (resistance change rate) | 349% | 20% | 18% | 85% | 30% | 28% | 80% |
| White turbidity | X | ○ | ○ | ○ | X | ○ | ○ |

The invention claimed is:

1. An optical laminate comprising
an optical film; and
a pressure-sensitive adhesive layer formed on a side of the optical film,
wherein the pressure-sensitive adhesive layer comprises a pressure-sensitive adhesive polymer having an alkyl (meth)acrylate unit having an alkyl group with 4 or more carbon atoms, an alkyl (meth)acrylate unit having an alkyl group with 3 or less carbon atoms, an aromatic group-containing monomer unit and a polar group-containing monomer unit that has a carboxyl group and an organic salt, and the polar group-containing monomer unit is present in an amount of 1.5 to 4.5 parts by weight relative to 100 parts by weight of the alkyl (meth)acrylate unit having an alkyl group with 4 or more carbon atoms, the pressure-sensitive adhesive layer has a room temperature storage elastic modulus of 0.07 MPa or more and a gel fraction of 80 wt % or more according to Equation 1 below:

$$\text{Gel fraction} = B/A \times 100 \quad \text{[Equation 1]}$$

wherein, B/A is a ratio of a dry mass (B) (unit: g) of an insoluble fraction recovered after immersing the pressure-sensitive adhesive layer in ethyl acetate at room temperature for 24 hours to a mass (unit: g) (A) of the pressure-sensitive adhesive layer before immersing the pressure-sensitive adhesive layer in ethyl acetate, wherein an amount of the alkyl (meth)acrylate unit having an alkyl group with 4 or more carbon atoms in the pressure-sensitive adhesive polymer is in a range of 50 wt % to 70 wt %, wherein the alkyl (meth)acrylate unit having an alkyl group with 3 or less carbon atoms is included in the pressure-sensitive adhesive polymer in an amount of 30 to 65 parts by weight relative to 100 parts by weight of the alkyl (meth)acrylate unit having an alkyl group with 4 or more carbon atoms.

2. The optical laminate according to claim 1, wherein the optical film is a polarizer.

3. The optical laminate according to claim 1, wherein the optical film is a polyvinyl alcohol polarizer containing potassium component and zinc component.

4. The optical laminate according to claim 3, wherein a ratio of the potassium component and the zinc component contained in the polyvinyl alcohol polarizer is in a range of 0.2 to 6.

5. The optical laminate according to claim 4, wherein the potassium component is included in an amount of 0.1 to 2 wt % based on a total weight of the polyvinyl alcohol polarizer.

6. The optical laminate according to claim 4, wherein the zinc component is included in an amount of 0.1 to 0.5 wt % based on a total weight of the polyvinyl alcohol polarizer.

7. The optical laminate according to claim 1, wherein an amount of the alkyl (meth)acrylate unit having an alkyl group with 4 or more carbon atoms in the pressure-sensitive adhesive polymer is in a range of 50 wt % to 65 wt %.

8. The optical laminate according to claim 1, wherein the alkyl (meth)acrylate unit having an alkyl group with 3 or less carbon atoms is methyl acrylate.

9. The optical laminate according to claim 1, wherein the alkyl (meth)acrylate unit having an alkyl group with 3 or less carbon atoms is included in the pressure-sensitive adhesive polymer in an amount of 30 to 58 parts by weight relative to 100 parts by weight of the alkyl (meth)acrylate unit having an alkyl group with 4 or more carbon atoms.

10. The optical laminate according to claim 1, wherein the aromatic group-containing monomer forming the aromatic group-containing monomer unit is represented by Formula 1 below:

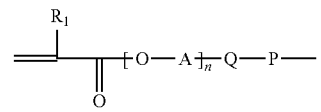

[Formula 1]

wherein, $R_1$ represents hydrogen or alkyl, A represents alkylene, n represents an integer in a range of 0 to 3, Q represents a single bond, —O—, —S— or alkylene, and P represents an aromatic ring.

11. The optical laminate according to claim 1, wherein the aromatic group-containing monomer unit is included in the pressure-sensitive adhesive polymer in an amount of 20 to 45 parts by weight relative to 100 parts by weight of the alkyl (meth)acrylate unit having an alkyl group with 4 or more carbon atoms.

12. The optical laminate according to claim 1, wherein the polar group-containing monomer is selected from a group consisting of (meth)acrylic acid, 2-(meth)acryloyloxyacetic acid, 3-(meth)acryloyloxypropyl acid, 4-(meth)acryloyloxybutyric acid, an acrylic acid dimer, itaconic acid, maleic acid and maleic anhydride.

13. The optical laminate according to claim 1, wherein the polar group-containing monomer unit is included in the pressure-sensitive adhesive polymer in an amount of 1.5 to 2 parts by weight relative to 100 parts by weight of the alkyl (meth)acrylate unit having an alkyl group with 4 or more carbon atoms.

14. The optical laminate according to claim 1, wherein the organic salt comprises a cation of Formula 2 below:

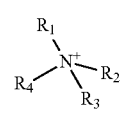

[Formula 2]

wherein, $R_1$ is an alkyl group having 1 to 3 carbon atoms, and $R_2$ to $R_4$ are each independently an alkyl group having 4 to 20 carbon atoms.

15. The optical laminate according to claim 14, wherein the organic salt comprises an anion of Formula 3 below or bisfluorosulfonylimide:

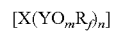

[Formula 3]

wherein, X is a nitrogen atom or a carbon atom, Y is a carbon atom or a sulfur atom, $R_f$ is a perfluoroalkyl group, m is 1 or 2, and n is 2 or 3.

16. The optical laminate according to claim 1, wherein an amount of metal salt in the pressure-sensitive adhesive layer is less than 0.05 wt %.

17. The optical laminate according to claim 1, wherein the pressure-sensitive adhesive layer further comprises a crosslinking agent for crosslinking the pressure-sensitive adhesive polymer.

18. A display device comprising a display panel to which the optical laminate of claim 1 is attached via the pressure-sensitive adhesive layer of the optical laminate.

19. The display device according to claim 18, further comprising an electrode wherein the pressure-sensitive adhesive layer directly contacts the electrode.

20. The optical laminate according to claim 1, wherein the room temperature storage elastic modulus of the pressure-sensitive adhesive layer is 0.07 to 0.2 MPa and the gel fraction of the pressure-sensitive adhesive layer is 80 to 95%.

* * * * *